Figure 1:
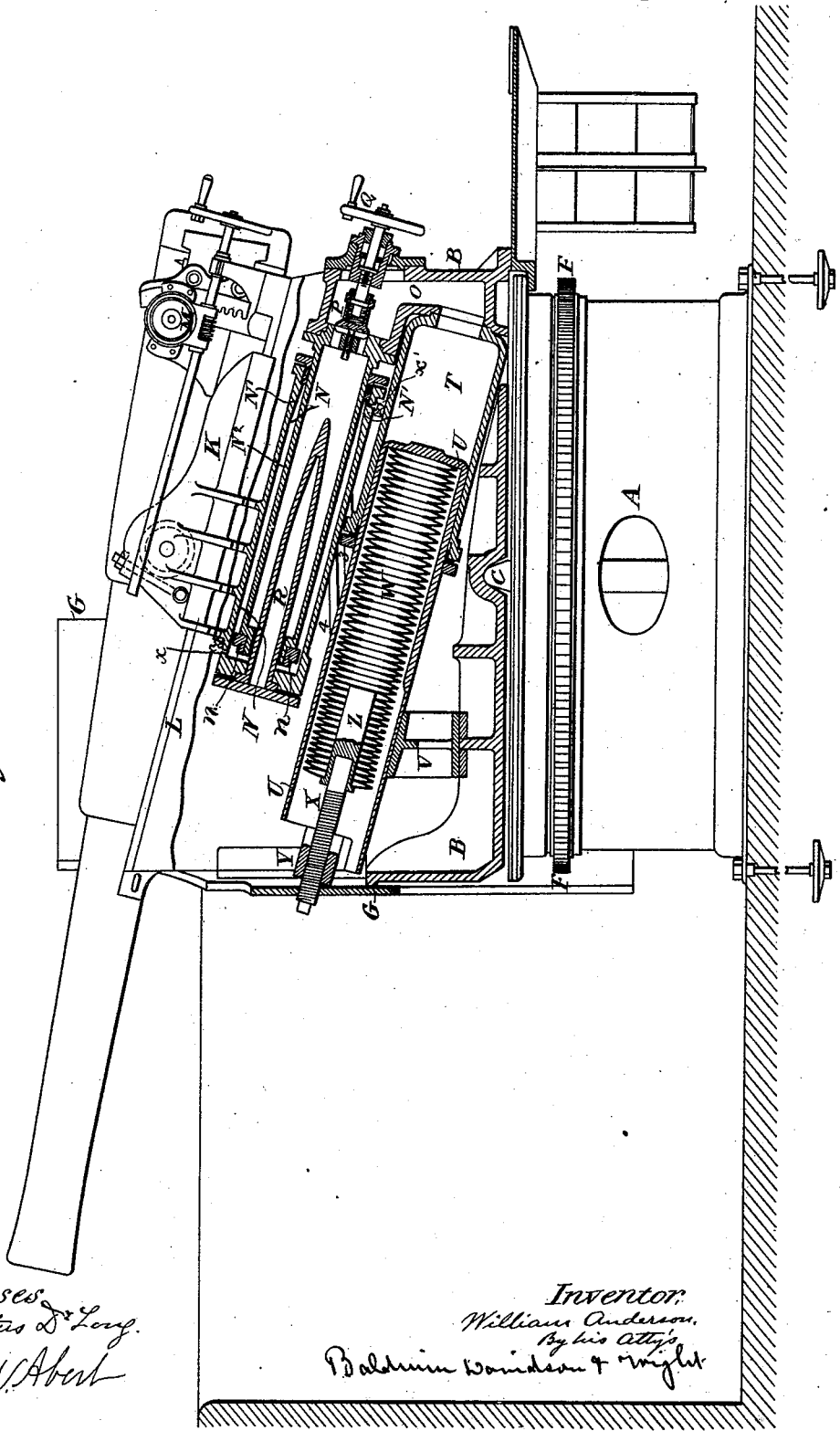

(No Model.) 6 Sheets—Sheet 1.

W. ANDERSON.
RECOIL CHECK FOR HEAVY ORDNANCE.

No. 424,448. Patented Apr. 1, 1890.

Witnesses:
Inventor:
William Anderson (No Model.) 6 Sheets—Sheet 3.

W. ANDERSON.
RECOIL CHECK FOR HEAVY ORDNANCE.

No. 424,448. Patented Apr. 1, 1890.

(No Model.) 6 Sheets—Sheet 4.

W. ANDERSON.
RECOIL CHECK FOR HEAVY ORDNANCE.

No. 424,448. Patented Apr. 1, 1890.

Witnesses
Baltus De Long
Robt. W. Abert

Inventor
William Anderson
By his Atty's.
Baldwin Davidson & Wight (No Model.) 6 Sheets—Sheet 5.
W. ANDERSON.
RECOIL CHECK FOR HEAVY ORDNANCE.

No. 424,448. Patented Apr. 1, 1890.

(No Model.) 6 Sheets—Sheet 6.

W. ANDERSON.
RECOIL CHECK FOR HEAVY ORDNANCE.

No. 424,448. Patented Apr. 1, 1890.

UNITED STATES PATENT OFFICE.

WILLIAM ANDERSON, OF WESTMINSTER, ENGLAND.

RECOIL-CHECK FOR HEAVY ORDNANCE.

SPECIFICATION forming part of Letters Patent No. 424,448, dated April 1, 1890.

Application filed July 10, 1889. Serial No. 317,000. (No model.) Patented in England November 30, 1886, No. 15,649.

*To all whom it may concern:*

Be it known that I, WILLIAM ANDERSON, engineer, a subject of the Queen of Great Britain, residing at 3 Whitehall Place, in the city of Westminster, England, have invented certain new and useful Improvements in Gun-Carriages, (for which I have received Letters Patent in Great Britain, dated November 30, 1886, No. 15,649,) of which the following is a specification.

In ordinary gun-carriages the force of recoil is made use of and stored for running out the gun by making the gun and its carriage slide or roll up an inclined plane. The recoil of guns has also been taken up by springs and by hydraulic cylinders and the force stored up by the compression of the springs has been used for running out the gun. I cause a hydraulic compressor to force water into a larger storage-cylinder fitted with a piston or ram working water-tight in it, and which piston or ram is loaded by means of springs to a sufficient extent to give the water-pressure necessary to run out the gun.
To retain the gun in the recoiled position for loading, I cause the water from the compressor to flow to the storage-cylinder through an automatic recoil-valve opening from the compressor to the storage-cylinder. This valve opens when the gun is fired and suffers the water to enter the storage-cylinder, but will not permit it to return. The gun consequently will remain in the loading position. When it is desired to run the gun out, then either the recoil-valve can be opened by some convenient appliance or a communication can be opened between the compressor and the storage-cylinder by a separate pipe and cock. For the purpose of running the gun back without firing, a pump is provided which takes the water from the compressor and forces it into the storage-cylinder, the recoil-valve being closed.

The storage-cylinder is not intended necessarily to take up the whole energy of recoil. So much as is not absorbed by friction and by the work of compressing the storage-springs or by working the breech mechanism, &c., is taken up by causing the water to flow out of the compressor through an aperture which is gradually reduced in area by means of a taper spindle or any other known means of automatically increasing the resistance to the escaping water. In order to protect the working parts as much as possible, I prefer to put the compressor and storage-cylinder, be they one or more, under the gun and arrange the slides so as to form a protection from hostile missiles, and make this thickness anything that the nature of the service may require. The mounting may be adapted to center pivots or any other form of carriage that is most convenient in each special case.

Figure 2:
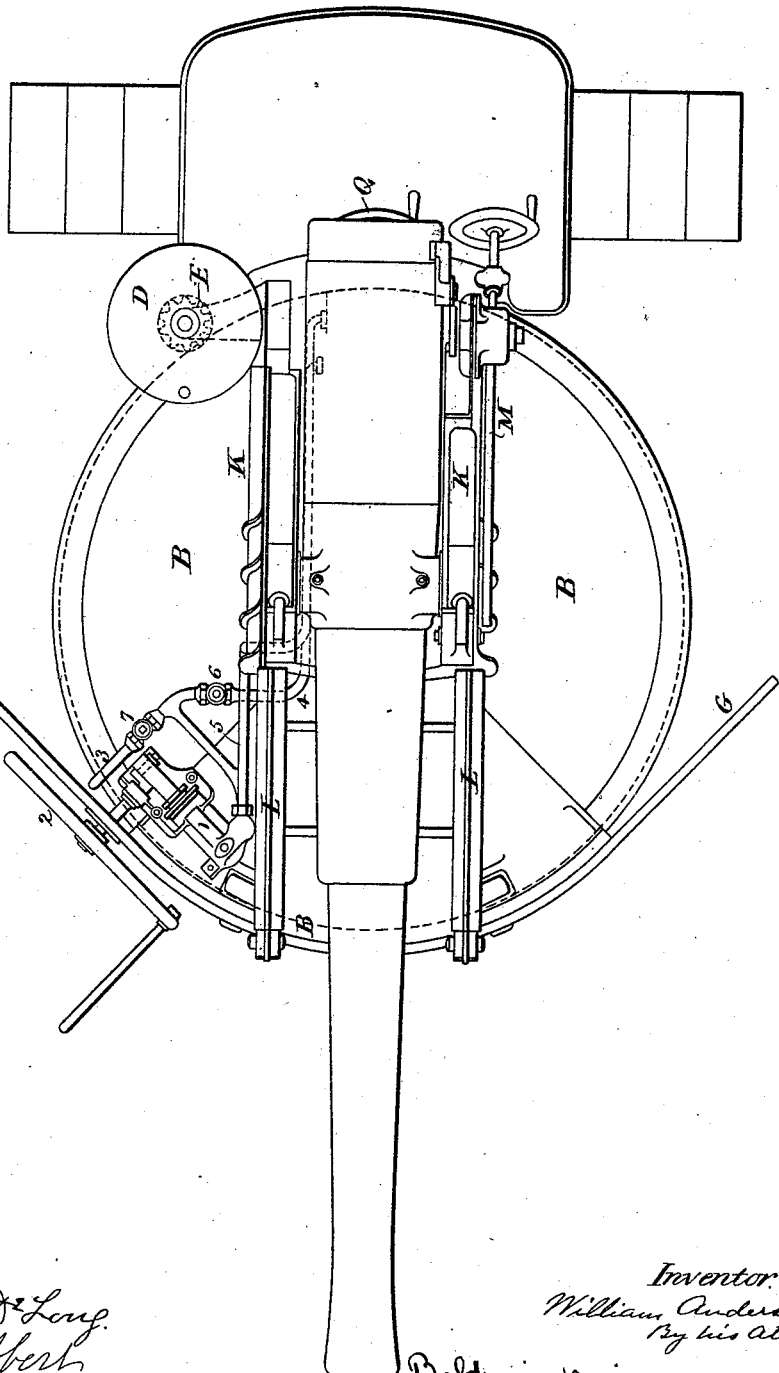
Figure 3:
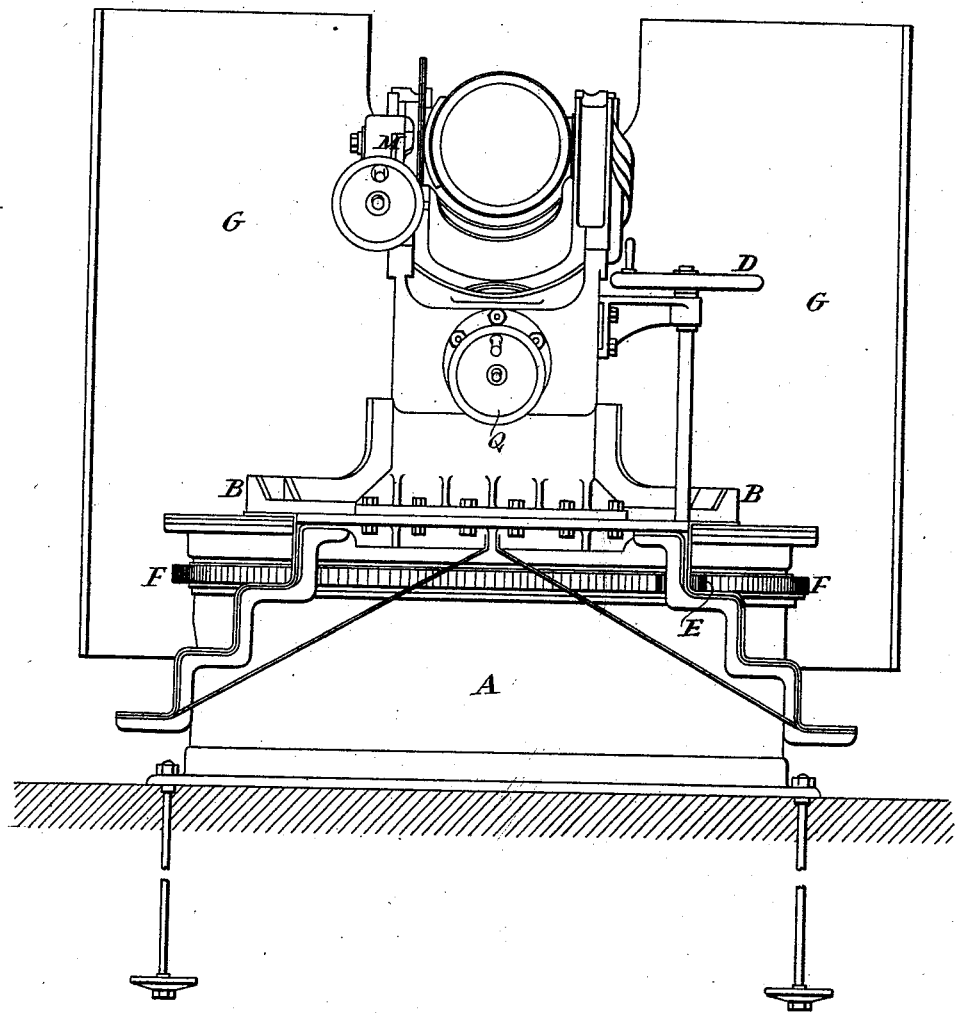
Figure 4:
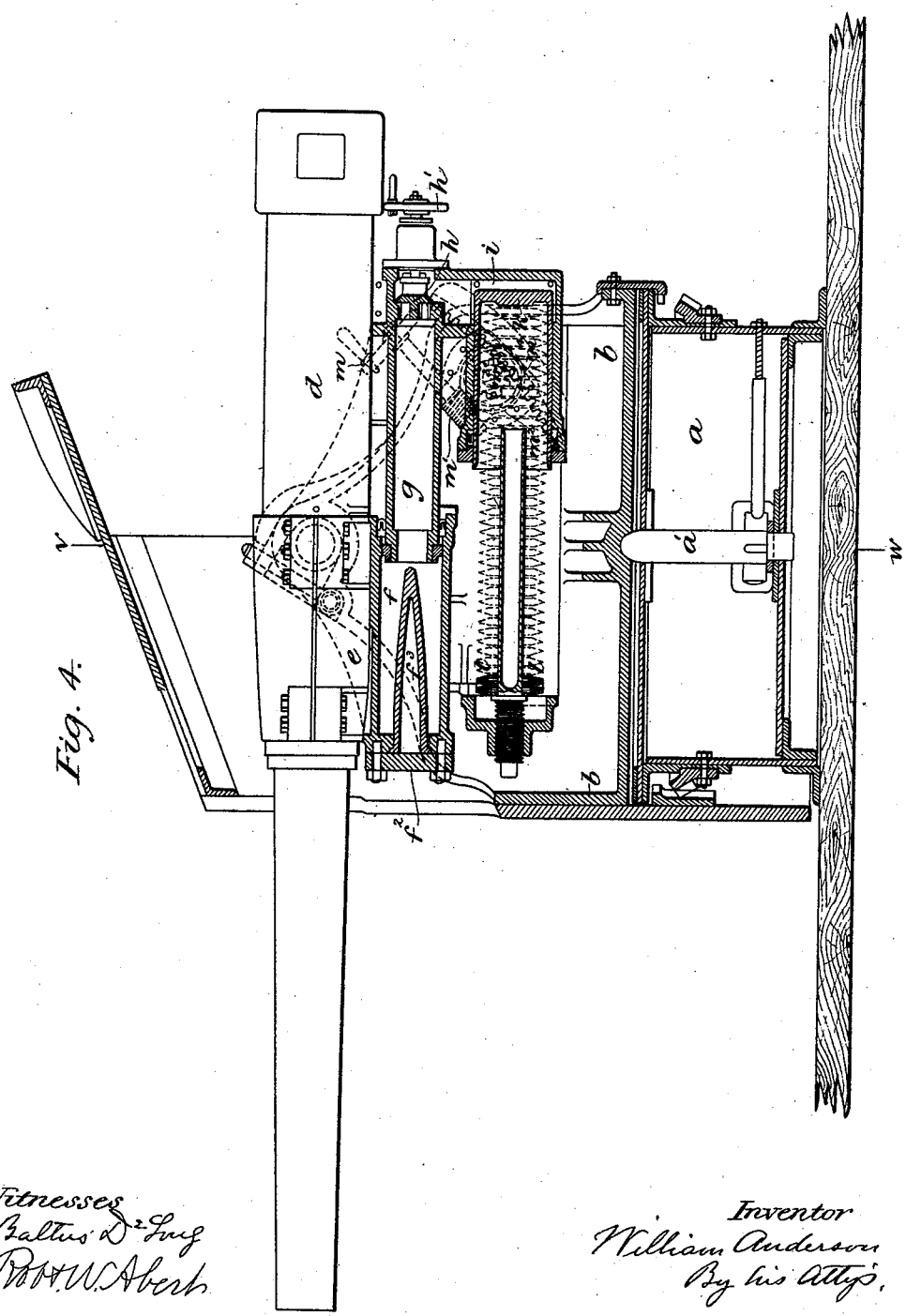
Figure 5:
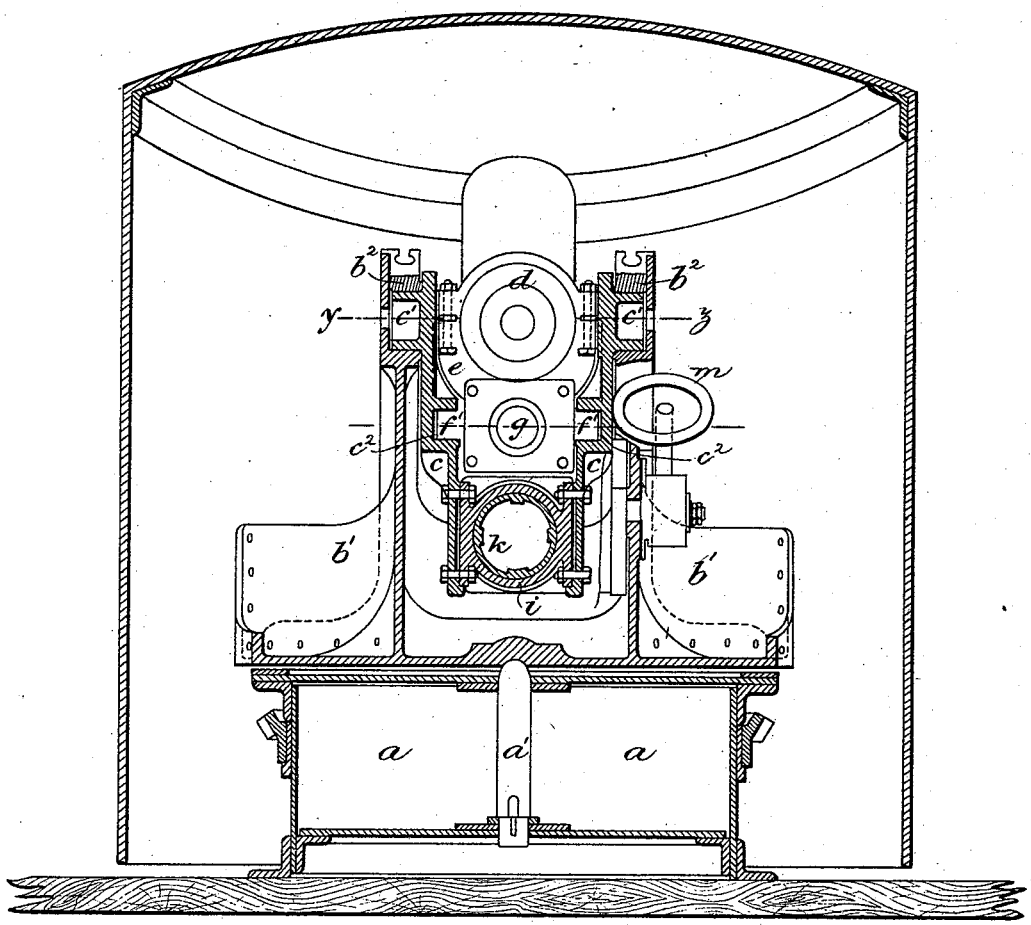
Figure 6:
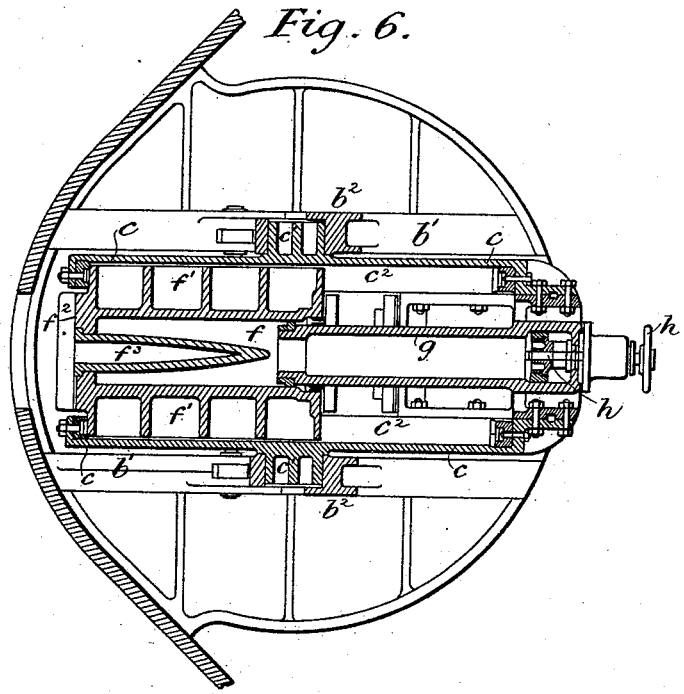
Figure 7:
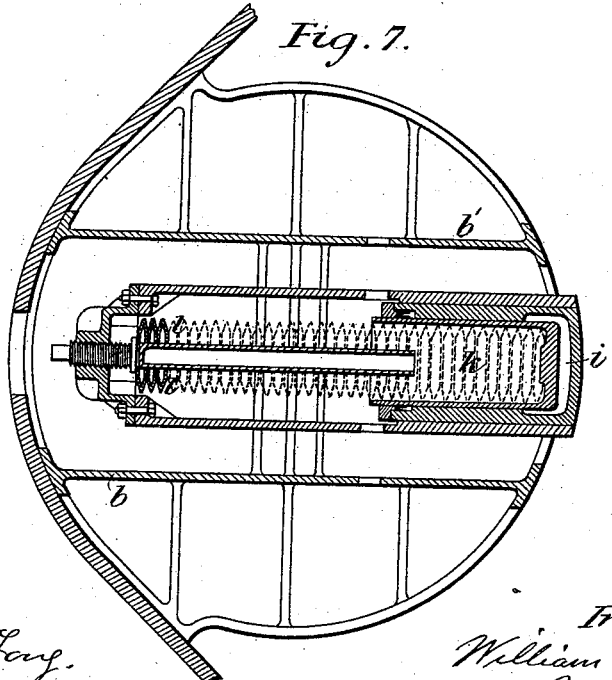

Figure 1 is an elevation and part section of a gun-mounting arranged in accordance with my invention. Fig. 2 is a plan. Fig. 3 is an elevation from the rear end, partly in section. Figs. 4, 5, 6, and 7 show a modification in which the recoil of the gun takes place in the line of fire. Fig. 4 is a vertical section with the gun in elevation. Fig. 5 is a transverse vertical section on the line $v\ w$, Fig. 4. Fig. 6 is a horizontal section on the line $y\ z$, Fig. 5. Fig. 7 is a horizontal section through the storage-cylinder.

In Figs. 1, 2, and 3 the gun is shown mounted on a base A, which may be of any convenient height or form to suit a ship or a fortification on shore.

The main framing of the carriage B revolves on the base A and is partly supported by the central pivot C. The carriage is revolved about the base by means of the hand-wheel D, which actuates a pinion E, that gears into a circular rack F, secured round the base A.

G is a shield secured to the front part of the framing B.

K is the carriage proper. It receives the trunnions of the gun and the elevating-gear M and moves upon the slides L, formed on the upper part of the framing B.

Under the gun and forming part of the carriage is the recoil-cylinder N, fitted with a hollow ram $N^2$, which works water-tight through packings at its lower end and is secured to the framing B, in which a hollow passage O is provided. P is the recoil-valve, through which the water in the cylinder N is driven through the hollow ram into the passage O. The recoil-valve P can be opened by the hand-wheel and screw-spindle Q when it is desired to run out the gun; but the wheel Q cannot shut the valve P rigidly, because a spiral spring is interposed which insures the valve closing, but cannot hold it, so that no accident can arise from accidentally leaving the recoil-valve spindle screwed home. To regulate the amount of recoil, the taper spindle or valve R is secured to the upper end of the cylinder. The spindle is thus capable of being moved longitudinally, and, being taper, will close the opening in the upper end of the hollow ram more or less, as may be needed.

To check the speed with which the gun runs out just before it reaches its extreme run-out position, the diameter of the recoil-cylinder N is made larger than that of the ram $N^2$ for the greater portion of its length; but the diameter is somewhat contracted toward the rear end at $N'$ for a few inches of its length and bored out truly a little larger than the ram. The forward end of the ram is fitted with an enlargement $n$, which nearly fits the contracted part of the cylinder. When the gun is running out, the water between the cylinder and the ram escapes freely until the enlargement $n$ reaches the contracted portion of the cylinder at $N'$, when the water between the piston-head and the rear end of the cylinder becomes imprisoned and can only escape as fast as the small clearance will allow, and this clearance may be adjusted so as to soften the shock at the completion of the running out to any desired extent.

Underneath the recoil-cylinder is the storage-cylinder T, of sufficient capacity to receive the whole contents of the recoil-cylinder N, but so altered in diameter that the stroke on the storage-cylinder plunger U is brought to any convenient length. The storage-cylinder T is bolted water-tight onto the passage O, formed in the framing B, and is thus in communication with the recoil-cylinder N. The plunger U works water-tight through the upper end of the storage-cylinder T and is guided by the support V, secured to the framing B. The plunger U is fitted with springs W, by preference disk-springs; but any other kind may be used. The abutment of the springs at the upper end is against the screw X, which works in a cross-head Y, forming the nut to it, so that by turning the screw in one direction or the other the tension on the springs may be varied. The lower point of the screw works in a socket Z, which serves as a support and guide to the springs when the ram is home.

The elevating-gear M is of the ordinary kind and needs no special description.

The action of the carriage is as follows: The degree of inclination of the slides is immaterial. They may be level or inclined to suit circumstances; but as a rule a downward inclination will be found best. The strength of the springs W and the degree of tension given to them in each particular carriage will depend upon the inclination of the slides and the nature of the service. Thus on board ship the tension should be sufficient to give hydraulic pressure competent to run the gun out against an inclination of deck of, say, eighteen degrees, while on land the provision may be much less. Hence the springs W are intended to store only so much of the force of recoil as will be sufficient under all circumstances to run the gun out, the remaining portion being taken up by throttling of the passage by the spindle R. The cylinders then being completely full of water, the gun run out, and the springs W screwed down with sufficient tension, the gun is fired. The force of recoil drives the recoil-cylinder N onto its ram and forces the water in it through the recoil-valve P into the storage-cylinder T. The plunger U will be driven out and the springs W will be further compressed. At the end of recoil the valve P will close and the gun will remain in the recoiled position, where it can be conveniently loaded. When ready for firing, the recoil-valve P is opened by the wheel Q. The pressure of the springs W drives the water out of the storage-cylinder T into the recoil-cylinder N, and the gun at once runs out and is ready for firing. The diameter of the taper spindle R is such that the pressure upon it is sufficient to start the gun at speed in running out. The hydraulic pressure in the storage-cylinder is greater when the gun is run in than when run out, on account of the springs being compressed more in the former than in the latter state. For the purpose of running the gun back without firing, for putting an initial hydraulic pressure into the cylinders, so as to insure the gun running out completely, and for securing the gun in bad weather on board ship, a small force-pump 1, worked by the crank and wheel 2, is provided. 3 is a suction-pipe for pumping fresh water in. 5 is the delivery-pipe into the passage O, and 4 is a suction-pipe from the hollow ram. By closing the cock 6 and opening 7 fresh water may be forced in by allowing the suction-pipe 3 to dip into a bucket. By closing the cock 7 and opening cock 6 the water from the recoil-cylinder can be pumped into the storage-cylinder and the gun by that means run in partly by the incline of the slides and partly by the atmospheric pressure acting on the cylinder. There is a small air-cock $x$ in the highest part of the recoil-cylinder to let out the air, and a cock $x'$ at the lower end for drawing off water.

For the larger sorts of guns it will be more convenient to have two or more recoil-cylinders and two or more storage-cylinders, and supplementary storage-cylinders may be arranged to provide hydraulic pressure for loading or training the gun.

In place of arranging the carriage proper K to recoil along slides L on the framing B, it may be carried on trunnions by the said framing, while the gun, with the movable element in the hydraulic apparatus, is arranged to recoil along slides on the carriage proper. Such an arrangement is shown by the Figs. 4, 5, 6, and 7. In these figures, $a$ is the base, and $a'$ the pivot. $b$ is a turn-table or rotating support, with two standards $b'\ b'$, and at the upper ends of the standards are bearings $b^2$, into which the trunnions $c'\ c'$ of the carriage $c$ are received. $d$ is the gun. It is able to slide longitudinally upon the carriage $c$, taking with it the ring $e$, which is clipped upon the gun, and also the hydraulic cylinder $f$, which is formed together with the clip-ring $e$. On the sides of the cylinder $f$ are wings $f'\ f'$, which enter grooves $c^3\ c^3$ in the sides of the carriage $c$. $f^2$ is the end cover of the cylinder $f$, and $f^3$ is a cone within the cylinder, operating, in the manner already described, to control the movement of the gun. $g$ is a hollow ram, which when the gun recoils, together with the cylinder $f$, enters this cylinder, and water or liquid contained in the cylinder $f$ and ram $g$ is then driven out past the non-return valve $h$. $i$ is a cylinder of larger diameter, which the liquid so expelled enters, and it forces the ram $k$ outward, compressing the disk-springs $l\ l$, as already explained. The springs $l$ exert their pressure against the closed end of the ram $k$. $h'$ is a hand-wheel for lifting the valve $h$ when it is desired that the gun should run out again after recoil. $m$ is a hand-wheel for working the elevating-gear. It has on its axis a worm $m'$, that gears into a worm-wheel $m^2$, and on the axis of the worm-wheel $m^2$ is a pinion $m^3$, that gears with a curved rack $m^4$, fixed upon the carriage $c$.

What I claim is—

1. In a gun-mounting, the combination of the gun, the recoil-cylinder, the bearings thereon, in which the gun is mounted, a hollow stationary piston or ram working in the recoil-cylinder, a valve R, progressively closing an opening or passage between the recoil-cylinder and the hollow ram, the storage-cylinder, a passage connecting the storage-cylinder with the ram and the recoil-cylinder, a hand-operated non-return valve in said passage, and a spring-actuated adjustable plunger in the storage-cylinder, substantially as described.

2. The combination of the framing B, the gun, the recoil-cylinder connected to and moving with the gun, the hollow ram $N^2$, extending into the recoil-cylinder and fixed to the framing B, the storage-cylinder, the spring-actuated plunger therein, a passage O in the framing B, connecting the hollow ram with the storage-cylinder, a hand-operated non-return valve in said passage, and a valve progressively closing an opening between the recoil-cylinder and the hollow ram, substantially as described.

3. The combination of the gun, the recoil-cylinder, the bearings thereon, in which the gun is mounted, the storage-cylinder, the adjustable spring-actuated plunger therein, passages connecting the recoil-cylinder with the storage-cylinder, a hand-operated non-return valve in the passage between the storage and the recoil cylinders, and a valve R, progressively closing the outlet from the recoil-cylinder, substantially as described.

WILLIAM ANDERSON.

Witnesses:
J. E. COMPTON-BRACEBRIDGE,
J. M. HAMILTON.